(12) United States Patent
Kotlarski

(10) Patent No.: US 6,397,428 B2
(45) Date of Patent: *Jun. 4, 2002

(54) WIPER BLADE FOR MOTOR VEHICLE WINDOWS WITH SUPPORT HAVING CONNECTION DEVICE WITH PROJECTIONS AND WELDING CONNECTION

(75) Inventor: Thomas Kotlarski, Buehlertal (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/771,290

(22) Filed: Jan. 26, 2001

Related U.S. Application Data

(63) Continuation-in-part of application No. 09/202,652, filed on Dec. 18, 1998, now Pat. No. 6,192,546.

(30) Foreign Application Priority Data

May 2, 1997 (DE) .......................................... 197 18 490

(51) Int. Cl.⁷ .................................................. B60S 1/40
(52) U.S. Cl. .................................. 15/250.43; 15/250.32
(58) Field of Search ........................ 15/250.43, 250.44, 15/250.361, 250.32, 250.31, 250.451, 250.452, 250.453, 250.454

(56) References Cited

U.S. PATENT DOCUMENTS 2,974,341 A  *  3/1961  Hart
3,132,367 A  *  5/1964  Wise
5,437,077 A  *  8/1995  O'Donnel
6,192,546 B1 *  2/2001  Kottarski ................. 15/250.43

FOREIGN PATENT DOCUMENTS

| DE | 1247161 | * | 8/1967 | ............. 15/250.32 |
| DE | 2614457 | * | 10/1976 | |
| DE | 1962711 | * | 1/1998 | |
| FR | 1069875 | * | 7/1954 | ............. 15/250.32 |
| FR | 1235573 | * | 5/1960 | ............. 15/250.32 |
| FR | 2268671 | * | 11/1975 | |

* cited by examiner

*Primary Examiner*—Gary K. Graham
(74) *Attorney, Agent, or Firm*—Michael J. Striker

(57) ABSTRACT

A wiper blade for motor vehicle windows has an elongated spring-elastic support element, an elongated, rubber elastic wiper strip which is pressable against a window to be wiped and is held substantially parallel to a longitudinal axis by the elongated, spring-elastic support element, a connection device for a driven wiper arm, the connection device being loaded toward the window and secured to a middle portion of the spring-elastic support element, remote from the window, the connection device being formed as a component which is separate from the support element, and a welding connection which connects the connection device with the support element, the support element being band-shaped, the connection device having a base resting flatly on a side remote from the window of the band-shaped support element and connected to the band-shaped supporting element by the welding connection.

7 Claims, 2 Drawing Sheets

WIPER BLADE FOR MOTOR VEHICLE WINDOWS WITH SUPPORT HAVING CONNECTION DEVICE WITH PROJECTIONS AND WELDING CONNECTION

CROSS REFERENCE TO A RELATED APPLICATION

This application is a continuation-in-part of U.S. patent application Ser. No. 09/202,652 filed Dec. 18, 1998, which has been allowed as U.S. Pat. No. 6,192,546.

BACKGROUND OF THE INVENTION

In wiper blades, the support element for the entire field swept by the wiper blade is intended to assure the most uniform possible distribution of the wiper blade contact pressure, originating in the wiper arm, against the window. By means of a suitable curvature of the unloaded support element—that is, when the wiper blade is not resting on the window—the ends of the wiper strip, which in wiper blade operation is pressed completely against the window, are located by the then tensed support element toward the window, even if the radii of curvature of spherically curved vehicle windows change in every wiper blade position. That is, the curvature of the wiper blade must be somewhat greater than the greatest curvature measured in the wiping field of the window to be wiped. the support element thus replaces the complicated support bracket construction with two spring rails disposed in the wiper strip of the kind used in conventional wiper blades.

In a known wiper blade of this type (German Patent Disclosure DE 26 14 457), the connection device is integrally joined to the support element. This may possibly be of secondary importance as long as the support element is made from a plastic which is therefore made by filling a suitable mold. However, if the support element is to be made of metal, then two demands directly contract one another. On the one hand, the support element should have good spring properties, but on the other the attachments of the connection device should be easily bent by approximately 90° out of the plane of the support element and fixed in that position, so that the loads occurring in operation between the wiper blade and the wiper arm can be absorbed on stop faces of these attachments. These two demands are virtually impossible to meet unless disadvantageous compromises in the choice of material are made.

In another known wiper blade (German Patent Disclosure DE 12 47 161), the support element is provided with a connection device as a separate component. This connection device is solidly joined to the support element with the aid of rivets. The requisite bores in the support element, however, lead to an undesired, because uncontrollable, change in the support element tension, so that a satisfactory window wiping result cannot be attained.

SUMMARY OF THE INVENTION

Accordingly, it is an object of present invention to provide a wiper blade for motor vehicle windows, which is a further improvement of the existing wiper blades.

In keeping with these objects and with others which will become apparent hereinafter, one feature of present invention resides, briefly stated, in a wiper blade, in which a connection device for a driven wiper arm has a base which rests flatly on a side remote from the window of a band-shaped support element, and is connected to the band-shaped support element by a welding connection.

In the inventive wiper blade, a choice of materials that suits the demands made of the particular component can be made for both the support element and the connection device. The joining of the two components to one another is done easily and economically by means of a welded connection. Further assembly steps can be omitted. Tests have shown that a welded connection does not impair, or insignificantly impairs, the contact pressure distribution by the support element and thus the outcome of window wiping.

If the support element and the connection device of the wiper blade are of metal, it can be expedient if the welded connection is a resistance weld.

Particularly in a wiper blade in which both the support element and the connection device are made of a plastic, operationally reliable and economical fastening of the connection device to the support element can be attained by means of ultrasonic welding.

The welding itself, both in resistance welding and ultrasonic welding, can be embodied as preferably multiple spot welds.

In a wiper blade of which major demands are made in terms of the load, however, the welded connection can also be embodied by a plurality of linear welds; with a view to the specifications to be met in terms of pressure distribution, the welds may extend either crosswise to the longitudinal direction or longitudinally of the band like support element.

A connection device that can be adapted without difficulty in view of the wiper arm design is obtained if it rests flatly with the base on the side of the bandlike support element remote from the window.

Especially good lateral guidance and holding of the two components to be joined together is attained if the protrusions are embodied as strips, which extend longitudinally of the support element.

A further-improved, stable holding of the connection device to the support element is attained if on the free ends of the strips, clawlike attachments oriented counter to one another are disposed, and the spacing between the clawlike attachments and the outside, remote from the legs of the base of the U is adapted to the thickness of the support element.

For positioning the connection device on the support element in the longitudinal direction thereof, the connection device can have at least one shoulder, pointing longitudinally of the support element, with which shoulder a counterpart shoulder of the support element is associated. The result is accordingly a positive positioning aid that becomes operative before the welding operation.

Absolute securing of the mounted position of the connection device on the support element is obtained if the connection device has at least two shoulders, pointing in opposite directions, with each of which the counterpart shoulder of the support element is associated.

Expediently, the shoulders of the connection device are embodied on a protrusion of the connection device, and the counterpart shoulders and are embodied on a recess, associated with the protrusion of the support element.

Further advantages features and refinements of the invention are described in the ensuing description of embodiments shown in the drawing.

DESCRIPTION OF THE PREFERRED EMBODIMENTS

Figure 1:
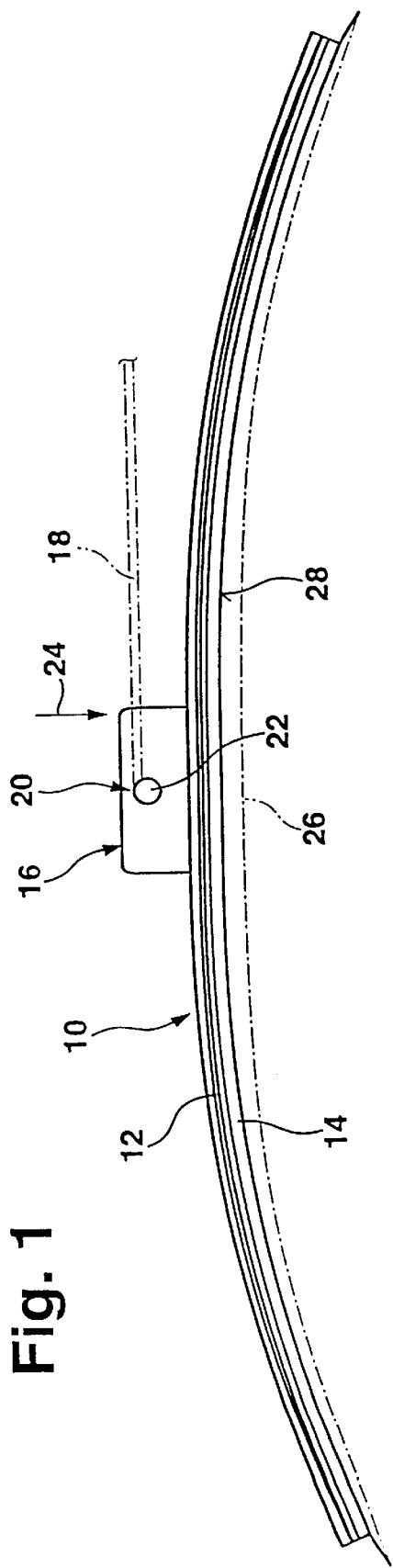
FIG. 1 is a side view of a wiper blade according to the invention.
Figure 2:
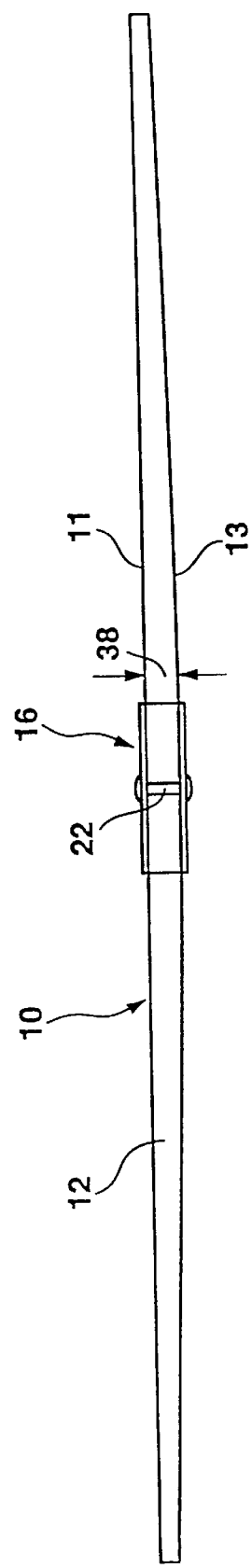
FIG. 2 is a plan view on the wiper blade of FIG. 1.

A wiper blade 10 shown in FIGS. 1 and 2 has an elongated, spring-elastic support element 12, to the underside of which an elongated, rubber-elastic wiper strip 14 is secured parallel to the longitudinal axis. A connection device 16, with the aid of which the wiper blade can be detachably joined to a driven wiper arm 18, is disposed on the support element, which can also be called a spring rail, in the middle portion thereof. A hook acting as a counterpart connection means is formed on the free end 20 of the wiper arm 18 and clasps a pivot pin 22 that belongs to the connection device 16 of the wiper blade. The securing between the wiper arm 18 and the wiper blade 10 is performed by securing means known per se and not shown in further detail, which are embodied as an adapter.

The wiper arm 18 and thus also the hook on its end 20 are loaded in the direction of the arrow 24 toward the window to be wiped, whose surface to be wiped is represented in FIG. 1 by a dot-dashed line 26. Since the dot-dashed line 26 is intended to represent the greatest curvature of the window surface, it is clearly apparent that the curvature of the wiper blade, resting with both its ends on the window, is greater than the maximum window curvature. The wiper blade presses with the contact pressure (arrow 24) presses over its entire length with its wiper lip 28 against the window surface 26. In the process, a tensing builds up in the spring-elastic support element 12 that assures proper contact of the wiper strip 14, or its wiper lip 28, over its entire length on the window. The connection between the support element 12 and the connection device 16 will now be explained in further detail in terms of FIGS. 3 and 4; 5 and 6; and 7 and 8.

Figure 3:
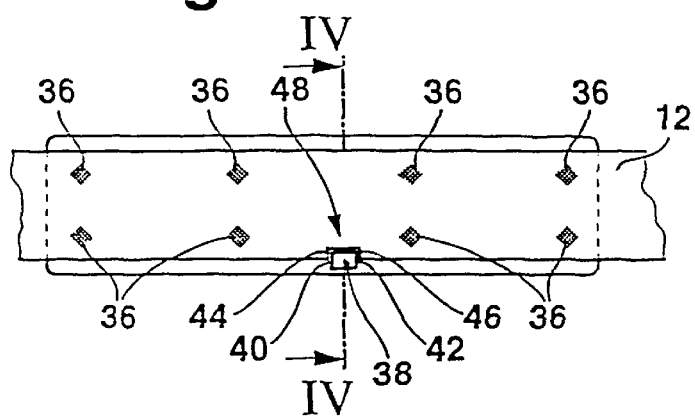
FIG. 3 is a view from below, on a larger scale of a support element that is part of the wiper blade and is provided with a first embodiment of the connection device.
Figure 4:
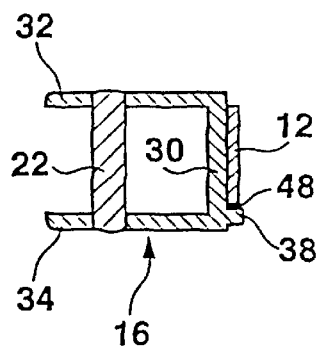
FIG. 4 is a section taken along the line IV—IV through the arrangement of FIG. 3.

In the first embodiment of the invention, shown in FIGS. 3 and 4, the connection device 16 is pressed flatly, with the outside of its base 30, against the surface, remote from the window to be wiped, of the bandlike support element 12. The legs 32 and 34 of the U of the connection device 16 extend on the side of the base 30 of the U remote from the support element 12. The pivot pin 22 is supported in the legs 32 and 34 of the U. The fastening of the connection device 16 to the support element 12 is done with the aid of a welded connection which will be described in further detail hereinafter.

While in the drawings the connection device 16 is substantially U-shaped cross-section, this is not necessary for the present invention. The connection device 16 must have only the base 30 or a base-like part, which can be flatly placed on the support element 12 and connected with the latter.

As a positioning aid, the base 30 of the connection device has a protrusion 38, extending from the side remote from the legs 32 and 34 of the U, and this protrusion has two shoulders 40 and 42 pointing in opposite directions—in the longitudinal direction of the support element 12. These shoulders 40 and 42 are each assigned a respective counterpart shoulder 44 and 46 of the support element, and the counterpart shoulders are embodied at a recess 48 of the support element 12. Because these shoulders point in the longitudinal direction of the support element, a positive connection is obtained between the support element 12 and the connection device 16 longitudinally of the support element. This positive engagement acts as a positioning aid when the welded connection is to be made.

Figure 5:
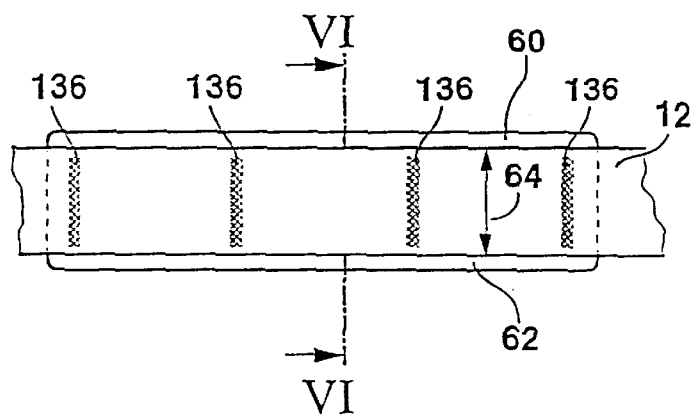
FIG. 5 is a view from below, on a larger scale, of a support element that is part of the wiper blade and is provided with a second embodiment of the connection device.
Figure 6:
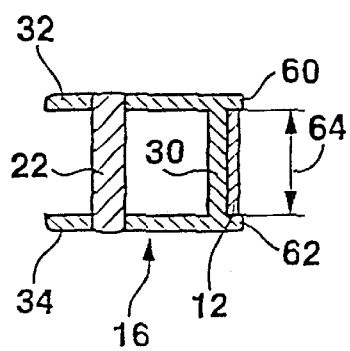
FIG. 6 is a section taken along the line VI—VI through the arrangement of FIG. 5.

In the exemplary embodiment of FIGS. 5 and 6, which shows a refinement of the arrangement of FIGS. 3 and 4, two striplike protrusions 60 and 62 are disposed, spaced apart from one another by a distance adapted to the width 64 of the support element 12, on the side of the base 30 of the U remote from the legs 32 and 34 of the U. The striplike protrusions 60 and 62 extending longitudinally of the support element 12 from lateral guides, which secure the position of the connection device 16 on the support element 12 crosswise to its longitudinal extent.

Figure 7:
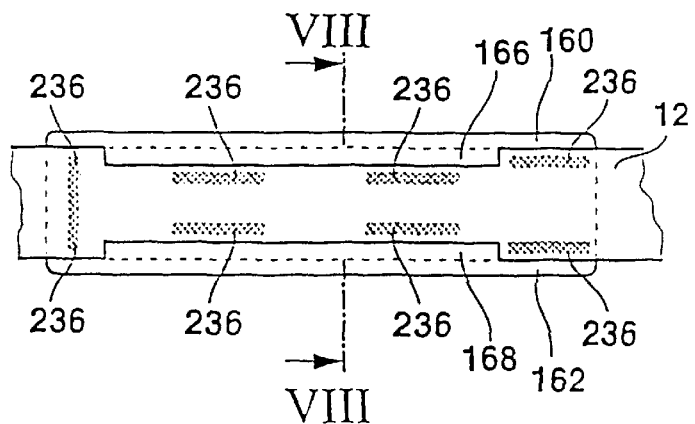
FIG. 7 is a view from below, on a larger scale, of a support element that is part of the wiper blade and is provided with a third embodiment of the connection device.
Figure 8:
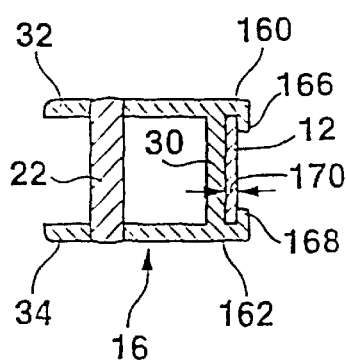
FIG. 8, a section taken along the line VIII—VIII through the arrangement of FIG. 7.

The embodiment of FIGS. 7 and 8 is based on the embodiment of FIGS. 5 and 6. In a departure from that embodiment, for further simplification of preassembly, the striplike protrusions 160 and 162 are provided, on their free ends remote from the base 30 of the U, with clawlike attachments 166 and 168 pointing in opposite directions from one another. The spacing between the outside of the base 30 of the U, remote from the legs 32, 34 of the U, and the side oriented toward the base of the attachments 166 and 168 is adapted to the thickness 170 of the support element 12. This adaptation is made such that just as in the embodiment of FIGS. 5 and 6, an easy but largely play-free relative motion between the two components 12 and 16 is possible.

It is shown in the embodiment of FIGS. 3 and 4 that the welded connectoin comprises a plurality of spotlike welds 36. In the embodiment of FIGS. 5 and 6, the welded connection has a plurality of linear welds 136, whose longitudinal extent is crosswise to the longitudinal direction of the support element 12. In the embodiment shown in FIGS. 7 and 8, the welds 236 are also linear. In a departure from the arrangement in FIGS. 5 and 6, in this embodiment of the invention the linear welds 236 are in the longitudinal direction of the support element 12.

The connection device 16 can be welded to the support element in one point or in one strip in a first region, and claws can be provided in which the connection device is additionally fixed to the support element, similarly to the claws shown in FIG. 8. With such a construction, the support element can make, while wiping the windshield having a changing curvature, a movement relative to the connection device which is perpendicular to the windshield. As a result, there is no tension between the connection device and the support element during the wiping movement.

In practice, it has been found that the few welds 36 or 136 or 236 assure an operationally safe and secure connection between the support element 12 and the connection device 116. Any impairment to the spring properties of the support element is kept within such narrow limits that in view of the wiping results to be sought it can be practically ignored. It does not matter whether the spring element 12 and the connection device 16 are each of metal or are of plastic. It is illuminating that in this case even different kinds of plastics can be joined together, which in view of their properties meet the demands made of them. In the case of a metal version, a resistance weld can be expedient, while in a plastic version an ultrasonic weld can have advantages.

It should also be noted that the positive connection described in the embodiment of FIGS. 3 and 4—that is, the protrusion 38 with its shoulders 40 and 42 and the recess 48 with its counterpart shoulders 44 and 46—can also be used in the embodiments of FIGS. 5 and 6 and FIGS. 7 and 8. It is also worth noting that the bandlike support element 12 in the exemplary embodiments is indeed made in one part, but it can also comprise multiple parts without thereby departing from the scope of the present invention.

Nor need the arrangement of welds 36, 136 and 236 be absolutely selected as shown in FIGS. 3, 5 and 7. On the contrary, it is also conceivable for them ti be disposed on the protrusions 60, 62, and 160, 162, or on the attachments 166, 168.

It should also be pointed out that the shape of the welds 36 or 136 or 236 is independent of how the connection device 16 is embodied. The disposition and shaping of the welds are merely shown as an example in FIGS. 3, 5 and 7.

It is clear that—in a departure from the exemplary embodiment shown—the counterpart shoulders 44, 46 need not necessarily be embodied on a recess, open at the edge, of the support element. In view of the operating tension present in the support element 12 and oriented toward the window 26, it may be advantageous to dispose the counterpart shoulders in a region of the support element 12 that is invulnerable in this respect. this can be done for instance in the region of the support element 12 facing the central region of the base of the U. In that case, the counterpart shoulders are embodied on an opening that is closed all the way around. Accordingly, the shoulders cooperating with them should then be placed on the connection device.

It should also be remembered that the arrangement of the positioning aid described can be employed independently of whatever way in which the connection device is to be joined to the support element.

What is claimed is:

1. A wiper blade for motor vehicle windows, comprising an elongated spring-elastic support element; an elongated, rubber elastic wiper strip which is pressable against a window to be wiped and is held by said elongated, spring-elastic support element; a connection device for a driven wiper arm, said connection device being loadable toward the window and secured to a middle portion of said spring-elastic support element, at a side remote from the window, said connection device being formed as a component which is separate from said support element, rests flatly on a side remote from the window of said band-shaped support element and is connected to said band-shaped supporting element by a welding connection said connection device having protrusions which are provided with claw shaped attachments pointing in opposite directions from one another, so that a spacing between an outside of said connection device is adapted to a thickness of said support element, the welding connection being arranged on said claw shaped attachments.

2. A wiper blade as defined in claim 1, wherein said connection device has a pivot pin for connecting of said connection device with a driven wiper arm.

3. A wiper blade as defined in claim 1, wherein said welding connection of said connection device and said band-shaped support element is provided in one point.

4. A wiper blade as defined in claim 1, wherein said welding connection of said connection device and said band-shaped support element is provided in one strip.

5. A wiper blade as defined in claim 1, wherein said welding connection is composed of a plurality of point shaped welding points.

6. A wiper blade as defined in claim 5, wherein said strips have free ends remote from said base of said connection device.

7. A wiper blade for motor vehicle windows, comprising an elongated spring-elastic support element; an elongated, rubber elastic wiper strip which is pressable against a window to be wiped and is held substantially parallel to a longitudinal axis by said elongated, spring-elastic support element; a connection device for a driven wiper arm, said connection device being loadable toward the window and secured to a middle portion of said spring-elastic support element, at a side remote from the window, said connection device being formed as a component which is separate from said support element; and a welding connection which connects said connection device with said support element, said support element being band-shaped, said connection device having a base resting flatly on a side remote from the window of said band-shaped support element and is connected to said band-shaped supporting element by said a welding connection said connection device having also legs joined by the base, said base on its side remote from said legs being provided with protrusions which are spaced from one another crosswise to a longitudinal extent of said support element by a distance which is adapted to a width of said support element, said protrusions being formed as strips which extend longitudinally of said support element.

* * * * *